April 20, 1954 A. B. JOHNSON 2,676,255
PULSE RECURRENT FREQUENCY DIVIDING CIRCUIT
Filed July 8, 1952
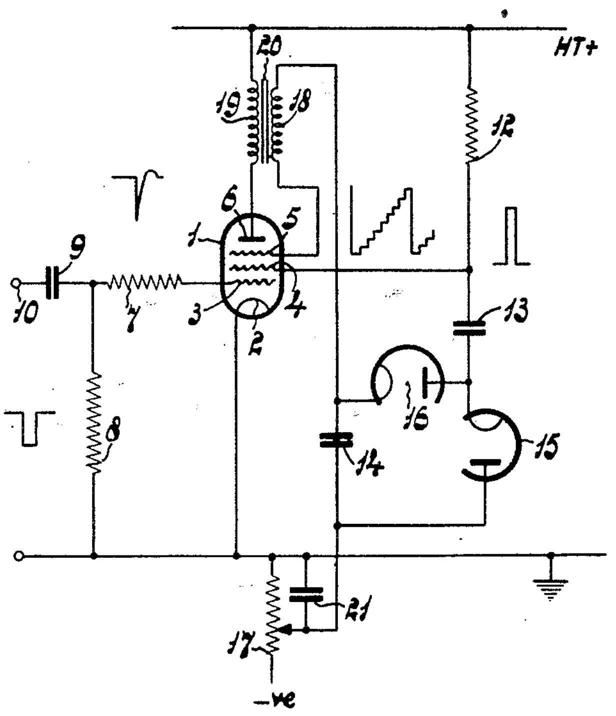
INVENTOR
Antony Bevis Johnson
BY [signature]
AGENT Patented Apr. 20, 1954 2,676,255

UNITED STATES PATENT OFFICE 2,676,255

PULSE RECURRENT FREQUENCY DIVIDING CIRCUIT

Antony Bevis Johnson, South Croydon, England, assignor to Hartford National Bank and Trust Company, Hartford, Conn., as trustee Application July 8, 1952, Serial No. 297,669

Claims priority, application Great Britain August 7, 1951

2 Claims. (Cl. 250—27)

This invention relates to circuit arrangements for pulse recurrent frequency division, which circuits may be used in the field of television, chronometry, industrial control, etc.

The object of the present invention is to provide a pulse repetition frequency dividing circuit which, over a wide range of frequencies, is substantially independent of the average pulse repetition frequency and substantially independent of the instantaneous pulse repetition frequency.

According to the invention, a pulse recurrent frequency dividing circuit comprises an electron discharge tube containing at least the electrodes of a pentode and a stepping circuit, wherein the input terminals of the stepping circuit are connected in a circuit between the screen grid of said tube and ground, and the output terminals of the stepping circuit are connected at one terminal to a source of negative voltage and at the other terminal to the suppression grid of said tube via the secondary of a transformer whose primary is in the anode circuit of said tube, the negative voltage being such as to cut-off initially the anode current of said tube, the dividing circuit being so arranged that when a negative pulse in excess of a minimum amplitude is applied to the control grid of said tube an amplified positive going pulse of substantial constant amplitude is produced at the screen grid whereupon the stepping circuit applies an incremental voltage to the suppressor grid which after a predetermined number of voltage increments, permits anode current to flow in said tube, which current by reason of said transformer, further increases the supressor grid voltage until current flows in that grid and resets the stepping circuit, the dividing circuit returning to its initial condition.

A stepping circuit is a circuit comprising at least two capacitors and two rectifiers (thermionic or otherwise) so arranged that when a pulse is applied to the circuit a voltage is developed and maintained across one of the capacitors, which voltage is a predetermined proportion of the pulse amplitude. This predetermined proportion is usually arranged to be small, for instance, less than a tenth. Thus for each pulse that is applied the voltage across the said capacitor is increased in steps, and therefore, that voltage is an indication of the number of pulses which have been applied to the circuit. Each incremental voltage step will be slightly less than the previous one since the effective pulse height will decrease each time by the voltage of the previous step.

Preferably this stepping circuit comprises a first capacitor and a first diode connected in series between the input terminals, the diode cathode being connected to the capacitor, and the series connection of a second diode and a second capacitor being connected in parallel with the first diode in such manner that the second diode anode is connected to the first diode cathode, the output being taken from across the second capacitor. The relationship between the magnitude of the voltage step produced across the second capacitor and the effective pulse amplitude applied to the input is governed mainly by the ratio of the capacitances of the first and second capacitors.

In order that the invention may be more clearly understood and readily carried into effect the invention will now be described more fully with reference to the accompanying drawing, by way of example:

The drawing shows diagrammatically a circuit arrangement for pulse repetition-frequency division which comprises a pentode and a double diode.

The pentode 1 comprises a cathode 2, a control grid 3, a screen grid 4, a suppressor grid 5, and an anode 6. The control grid 3 is connected via an isolating resistor 7 and a further high resistance 8 to ground. The negative going pulse input is applied via terminal 10 through capacitor 9 to the junction of the resistors 7 and 8. By this arrangement the load on the pulse source may be negligible.

The screen grid 4 is connected via a suitable resistor 12, to H. T. positive. Also to the screen grid 4 is connected a diode stepping circuit which comprises capacitors 13 and 14, and diodes 15 and 16. One end of capacitor 13 is connected to the cathode of diode 15 and to the anode of diode 16. The cathode of diode 16 is connected to the anode of diode 15 by means of the capacitor 14, the junction of diode 15 and capacitor 14 being connected to a variable negative potential provided by a negative voltage source and a potentiometer 17 shunted by a large capacitor 21. The diode 15 acts as a clamp and conducts whenever the junction of the anode of diode 16 and the the cathode of diode 15 goes negative with respect to the anode of diode 15 and thus prevents the capacitor 14 from charging in the opposite direction from that during the stepping action.

The junction of diode 16 and capacitor 14 is connected via the secondary 18 of a transformer 20 to the suppressor grid 5. The primary 19 is connected between the anode 6 and the H. T. positive. The windings of the primary 19 and the secondary 18 are so arranged that when the anode 6 goes negative the suppressor grid 5 goes positive.

The circuit functions as follows:

The cathode 2, control grid 3 and screen grid 4 act as a triode and when a negative going pulse of an amplitude greater than the control grid base is applied to the control grid 3, pulse clipping takes place, and a positive going pulse of substantially constant amplitude is produced at screen grid 4 and thus across the diode stepping circuit. The capacitor 21 has a large value and hence the potential at the junction of capacitor 14 and diode 15 remains substantially constant over a whole cycle, the potential being more negative than the cut off potential of the suppressor grid 4, thus when the positive going pulse is applied to the diode stepping circuit, diode 16 conducts and a proportion of the potential of the pulse is developed across capacitor 14, the proportion depending mainly upon the ratio of the capacitance of capacitor 13 to capacitor 14. At the end of the pulse the anode of diode 16 is negative with respect to the cathode and thus the diode ceases to conduct causing an incremental charge to remain on capacitor 14. Since the ratio of the capacitance of capacitor 13 to capacitor 14 is small the potential produced across capacitor 14 is a small proportion of the screen grid pulse.

When the next pulse arrives at the control grid 3 the procedure is repeated, except that the effective pulse amplitude is reduced by the potential remaining on the capacitor 14, and a further increase is made to the potential across capacitor 14.

This continues until the potential developed across capacitor 14 and hence at the suppressor grid 5 becomes such that anode current which until now had been cut off, begins to flow, the anode potential falls and because of transformer 20 the suppressor grid becomes more positive and thus a rapid cumulative action occurs until the anode potential reaches a minimum whereupon the cumulative action reverses and the suppressor grid potential is driven negative until the anode current is again cut off. Meanwhile, while the suppressor grid was positive the capacitor 14 was discharged by suppressor grid current so that the circuit is then again ready to begin another complete cycle.

Thus if the circuit is arranged so that ten potential steps are applied to capacitor 14 before anode current starts to flow it will be observed that ten input pulses will have been applied to the control grid 3 but only one pulse will have been obtained from the anode. Thus a division by a factor of ten has been accomplished. The frequency division obtained with this circuit is primarily determined by the ratio of the capacitances of capacitors 13 and 14, but the division may to some extent be controlled by potentiometer 17 which is able to vary the initial voltage applied to the suppressor grid 5.

Since the pentode 1 acts as a clipping amplifier for the input pulses it is necessary that the pulses should be above the minimum at which clipping occurs. The reverse resistance of the diode 16 is very high, enabling the capacitor 14 to retain its charge for comparatively long periods. Thus it is possible to perform the division of pulse-repetition frequency within a fairly wide range of frequency and also to perform division when the pulses occur at irregular intervals of time.

The pulse at the anode is negative going and may be applied to a second similar circuit, thus several of these circuits may be connected in cascade.

The diode 15 may be replaced by a crystal rectifier and thus if a suitable diode pentode is available a substantial saving in cost may be effected.

What I claim is:

1. A pulse recurrent frequency dividing circuit comprising an electron discharge device having cathode, control, screen, suppressor and anode electrodes and circuits therefor, means for applying negative pulses to said grid electrode, said electrodes having potentials thereon at which when the magnitude of said negative pulses exceeds a predetermined minimum voltage amplified positive pulses of substantially constant amplitude are produced at said screen electrode, a transformer having primary and secondary windings, said primary winding being disposed in the anode circuit of said device, and a stepping circuit having a pair of input terminals and output terminals, one of said input terminals being connected to said screen electrode and the other of said input terminals being connected to ground, one of said output terminals being connected through the secondary winding of said transformer to said suppressor electrode and the other of said output terminals being connected to a source of negative potential, the voltage of said negative potential source having a value at which anode current in said device is normally cut-off, said secondary winding being coupled to said primary winding to provide at said suppressor electrode a voltage increasing in the positive direction when the voltage at the anode electrode is increasing in a negative direction, said stepping circuit including circuit means for applying an incremental voltage to said suppressor electrode at the occurrence of each of said positive pulses, whereby after a predetermined number of voltage increments anode current flows in said device causing a further increase in the suppressor electrode voltage which restores the dividing circuit to its initial condition.

2. A frequency dividing circuit, as set forth in claim 1, wherein said circuit means includes a first capacitor, a first diode connected in series with said capacitor between said input terminals, the cathode of said diode being connected to said capacitor, a second capacitor, and a second diode connected in series with said second capacitor in parallel with said first diode, the anode of said second diode being connected to the cathode of said first diode, said second capacitor being interposed between said output terminals.

References Cited in the file of this patent

UNITED STATES PATENTS

| Number | Name | Date |
|---|---|---|
| 2,405,238 | Seeley | Aug. 6, 1946 |
| 2,487,191 | Smith, Jr. | Nov. 8, 1949 |